Figure 5:
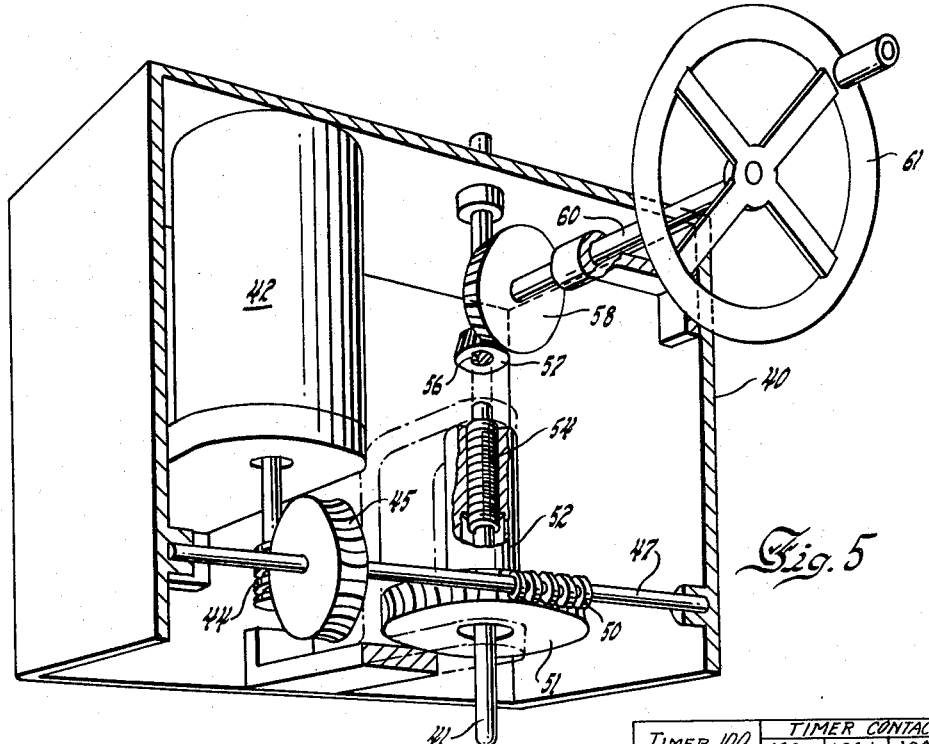

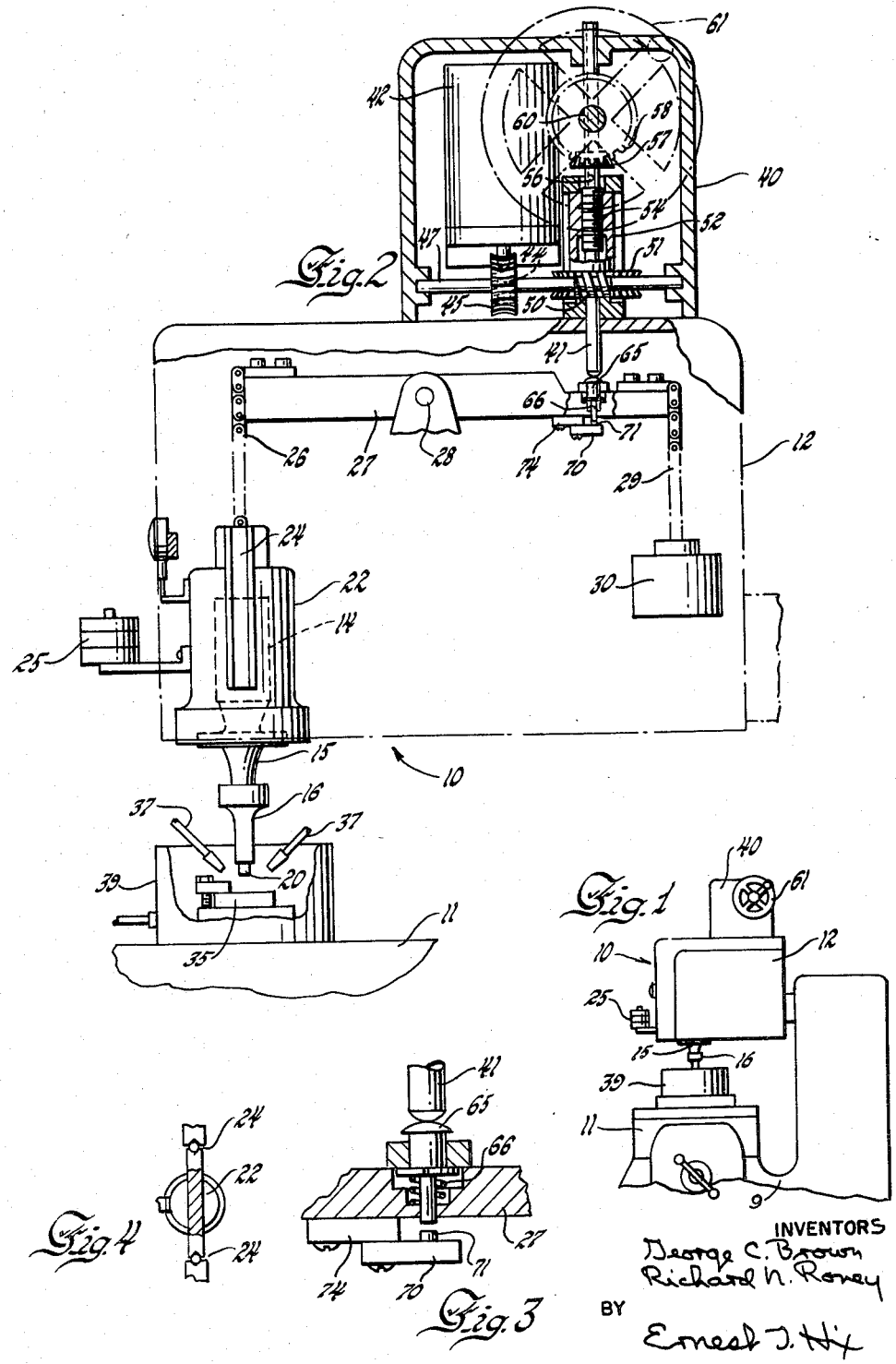

June 28, 1960 G. C. BROWN ET AL 2,942,383
MACHINE DEVICE
Filed Oct. 17, 1957 2 Sheets-Sheet 2

| TIMER 100 | TIMER CONTACTS | | |
|---|---|---|---|
| | 100a | 100b | 100c |
| DEENERGIZED | X | O | O |
| ENERGIZED (TIMING) | O | X | X |
| TIME OUT | X | O | O |

INVENTORS
George C. Brown
Richard N. Roney
BY
Ernest J. Hi
ATTORNEY

United States Patent Office 2,942,383
Patented June 28, 1960

2,942,383

MACHINE DEVICE

George C. Brown and Richard N. Roney, Dayton, Ohio, assignors to The Sheffield Corporation, Dayton, Ohio, a corporation of Delaware Filed Oct. 17, 1957, Ser. No. 690,687

12 Claims. (Cl. 51—59)

This invention relates to a feed control apparatus and more particularly, to an apparatus for controlling the feed of a machine for forming materials by means of a tool oscillated at high frequencies and minute amplitudes while in association with a workpiece.

Machines are now provided which have particular application to the forming or drilling of extremely hard materials and which utilize high frequency oscillations of a tool through minute amplitudes relative to a workpiece flooded with a liquid abrasive. These machines commonly operate at frequencies in the ultrasonic range.

Removal of work material whether caused by impact of abrasive with the tool, agitation and driving of the abrasive by cavitation within the liquid, or by erosion through cavitation alone, depends basically on acceleration and velocity of the tool tip. With a reference frequency in a resonant system acceleration and maximum velocity depend upon the amplitude of movement.

For most efficient operations it is desirable to maintain optimum amplitude of oscillation of the tool relative to the work. It has been found that when feed is too fast or the downward force on the tool is too great the amplitude of tool movement is damped and increased tool wear can occur. Of course, if feed is too slow, the most rapid work removal is not obtained.

Further, where the feed rates are not properly controlled, the working areas, particularly in deeper holes, is often starved of liquid abrasive. Tool and work can become wedged together, delicate tools are buckled or distorted and other disadvantageous results occur.

It is accordingly an object of this invention to provide a feed control apparatus for a forming tool oscillated at high frequency and minute amplitude in which there is controlled feed of the tool for optimum results, optimum feed rates, to prolong tool life, and to prevent damage or distortion of the forming tool, the work or associated components.

It is a further object to provide such an apparatus including power driven feed control means for controlled feed with optimum amplitude of oscillation of the forming tool in its minute operating range and most efficient operation for maximum forming rate.

It is a further object to provide such an apparatus wherein the power driven feed control means is driven at a reference rate and signal means responsive to deviations between the reference and actual forming rates are operative to control said power means.

It is a further object to provide such an apparatus wherein the signal means sense obstructions to tool advancement at the reference rate due to, as examples, lack of liquid abrasive at the forming area or too rapid a feeding rate, and is operative to momentarily reverse the feed movement of the tool to clear the tool so that abrasive is free to reach the forming area and the obstruction is removed, following which feed is restored.

Figure 6:
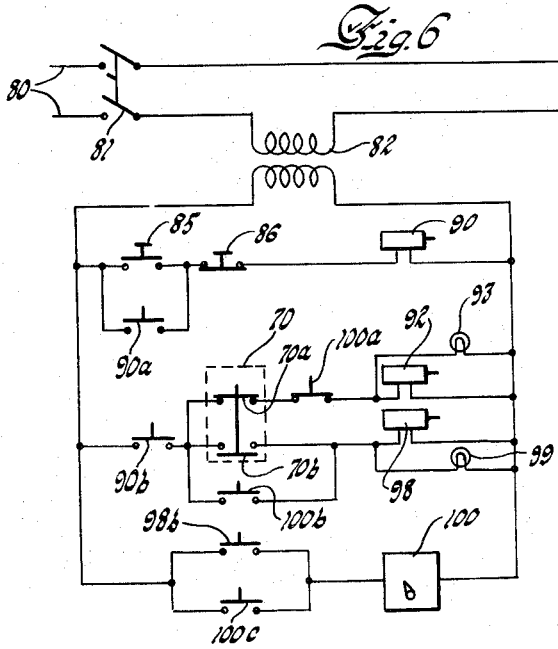
Figure 7:
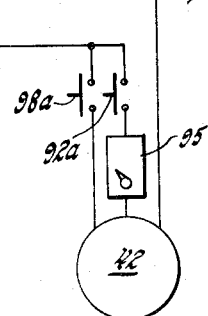

Other objects and advantages of the invention will be apparent from the accompanying description, the appended claims and the accompanying drawings, in which, Figure 1 is a side view in elevation of a portion of an exemplary machine embodying the present invention, Figure 2 is a vertical section through a portion of the machine of Figure 1, Figure 3 is an enlarged fragment of the switch means of Figure 2 in a second operating position, Figure 4 is a fragment looking downward at the upper end of the high frequency forming unit, Figure 5 is a view in perspective of the power driven feed means of the apparatus with one side of its housing removed, Figure 6 is an exemplary electrical control circuit responsive to the switch means for controlling the power feed, and Figure 7 is a chart of switch conditions in the circuit of Figure 6.

In the present apparatus a tool oscillating at high frequencies and through minute amplitudes is urged downward by gravity for feed movement toward the work in a non-positive manner. A power driven controlling device can be adjusted to different speeds to regulate this feed movement. Should obstruction to or delay in feed occur the controlling device is operative to momentarily lift the tool to allow full flooding of the working area with abrasive following which downward feed is restored.

Referring to the drawings, wherein an illustrative embodiment and application of the invention is shown, Figure 1 illustrates an exemplary machine 10 including an adjustable work supporting table 11 and an operating head 12 carried on base 9.

The high frequency forming unit includes a magnetostrictive transducer 14 for converting electrical energy into high frequency mechanical oscillations, a formed connecting body 15, a tool holder 16 and a suitable forming tool 20. Transducer 14 is housed in a carrier 22 supported at each side by ball ways 24 (see Figure 4). Carrier 22 is supported by chain 26 at one end of a rocking beam 27 pivoted at 28. Beam 27 also supports through chain 29 a counterbalancing weight 30 at its other end. However, the weight of carrier 22, the components it supports, and additional weights 25 is such as to urge beam 27 in a counter-clockwise direction as seen in Figure 2.

Tool 20 is shown retracted in Figure 2. During operation it is moved downward into association with a workpiece such as that indicated at 35, and the working area is flooded with liquid abrasive supplied through conduits indicated at 37. Retainer 39 surrounds the operating area.

A machine of this general character is illustrated and described in more detail in Patent Number 2,791,066, issued May 7, 1957.

During excitation of transducer 14 in a known manner tool 20 oscillates vertically at minute amplitudes and forms a depression or hole in workpiece 35 through cooperation with the liquid abrasive.

A power driven feed control unit 40 mounted on the upper surface of head 12 has a vertical feed control rod 41 extending through the upper portion of head 12 into cooperation with the rearward end of beam 27. In this embodiment a reversible electric motor 42 drives worm 44 meshing with worm gear 45 on horizontal shaft 47. Worm 50 on shaft 47 drives worm gear 51 for rotation of nut 52 threaded on screw 54, forming part of rod 41. The worm and worm gear sets provide a reduction from motor 42 to rotate nut 52. Rod 41 is vertically movable within unit 40 and has an extended portion along its length keyed at 56 within bevel gear 57 which in turn meshes with bevel gear 58 on shaft 60 fixed to hand crank 61.

When motor 42 is driven in either direction rod 41 is held against rotation through key 56 and moves vertically as nut 52 is rotated relative to screw 54. When motor 42 is not operating hand crank 61 serves to rotate screw 54 within stationary nut 52 for vertical reciprocation of rod 40.

The lower end of rod 41 opposes the upper end of a pin 65 vertically slidable within the rearward end of beam 27. Pin 65 is urged upward relative to beam 27 by spring 66 seated therein (see particularly Figure 3). A signal providing switch 70, operative for purposes later described, has an actuating plunger 71 opposing the lower end of pin 65. Switch 70 is mounted on beam 27 through block 74. Switch 70 operates to control motor 42 of feed unit 40 through a circuit described in detail below. The rate of rotation of motor 42 is controllable and is set to drive in one direction to retract rod 42 at a predetermined rate, thus allowing carrier 22 to move downward at a desired rate of feed. So long as the actual drilling or forming rate of tool 20 into workpiece 35 is at least equal to the predetermined feed rate, the lower end of rod 41 engages pin 65 and maintains it in a positive coupling with beam 27 to determine the rate of upward movement of the rear end thereof. This condition is shown in Figure 2. Thus a rate is determined to provide optimum amplitude, to prevent wedging, provide best practical abrasive action, and to prevent distortion, unnecessary wear, or destruction of forming components. Under this condition of operation plunger 71 of switch 70 is depressed.

If an obstruction to forming is encountered, as might occur if abrasive was not present at the forming area, the actual feed rate would be below that of the reference rate. Rod 41 would continue its retraction but beam 27 would not follow it and pin 65 would then be urged upward relative to beam 27, releasing switch plunger 71. After a given movement of plunger 71 the switch contacts are actuated to signal the condition. Through the circuit provided, motor 42 is then reversed for a predetermined period to move rod 41 downward to engage and rock beam 27 and retract tool 20 to clear the working area and allow its flooding with abrasive. After this predetermined reversal, upward movement of rod 41 and normal feed is restored. Figure 3 illustrates the condition with pin 65 urged upward and plunger 71 released.

Figure 6 illustrates diagrammatically an exemplary control circuit for converting the signals provided by switch 70 into control of motor 42. Power is supplied from main line leads 80 through switch 81 to transformer 82 and motor 42. Transformer 82 is connected to the relay controlling portion of this circuit.

Manually operated start switch 85, when depressed, completes a circuit through stop switch 86 to relay 90. Relay 90 immediately closes contacts 90a in a holding circuit around switch 85 which opens when released. Relay 90 also closes contacts 90b. Manual switch 86 when depressed de-energizes relay 90 to open the circuit and stop operation of unit 40. Switch 70 includes contact sets 70a and 70b. As diagrammatically shown, contacts 70a are closed and contacts 70b are open and this is the condition of these contacts when feed is determined by the retraction of rod 41 with the lower end of the rod in firm engagement with pin 65 in abutting relation with beam 27. In this condition closing of contacts 90b completes a circuit through contacts 70a and timer controlled contacts 100a to relay 92 and signal light 93. Relay 92 closes contacts 92a to motor 42 for rotation thereof at a rate determined by a controllable potentiometer indicated diagrammatically at 95 to move rod 40 upward and provide a predetermined feed rate.

If the actual rate of tool 20 is below that determined by the retraction of rod 41 pin 65 moves upward as previously described, releasing plunger 71 of switch 70 and reversing the conditions of contacts 70a and 70b from the condition of Figure 6. This serves to open contacts 70a to relay 92 which in turn opens contacts 92a to discontinue rotation of motor 42 in the direction to move rod 40 upward. Simultaneously, contacts 70b are closed to relay 98 and signal light 99. Relay 98 immediately closes contacts 98a to motor 42, reversing its direction of rotation to move rod 40 downward into firm engagement with pin 65 and positive coupling with the rearward end of beam 27 to retract carrier 22 and tool 20.

Relay 98 also closes contacts 98b to a commercially-available timer 100, which is adjustable. Timer 100 includes three sets of contacts indicated at 100a, 100b and 100c and the condition of these contacts with timer 100 de-energized is as shown in the chart of Figure 7 with contacts 100a closed and the others open. When timer 100 goes into its timing condition upon closing of contacts 98b, contacts 100a are opened to maintain relay 92 de-energized, contacts 100b are closed around switch 70 to maintain relay 98 energized irrespective of the condition of contacts 70a and 70b, and contacts 100c close in a holding circuit to the timer. Thus motor 42 is maintained in its reverse condition to continuously move rod 40 downward during the timed period.

At the termination of the predetermined retraction of the tool, timer 100 goes into its time-out condition and upward movement of rod 40 is restored.

Through the circuit of Figure 6 the signals of switch 70 control motor 42. A predetermined maximum feed rate is provided for optimum operation as previously described. Should the actual feed rate drop below this reference rate tool 20 is automatically retracted for a given time to allow full flooding of the working area following which the reference forming rate is restored.

Thus it is seen that an apparatus has been provided for precisely controlling the feed rate of a high frequency machine. Optimum operating conditions are insured and damage to the work and to forming components of the machine is prevented.

While the apparatus herein described constitutes a preferred embodiment of the invention, it is to be understood that the invention is not limited to the precise apparatus described and that changes may be made therein without departing from the scope of the invention which is defined in the appended claims.

What is claimed is:

1. Apparatus for forming materials by means of a tool fed relative to the work while oscillating at high frequencies and minute amplitude in association with a workpiece, comprising a forming unit including a tool and a high frequency driver therefor, a carrier supporting said unit for movement to direct said tool along the forming path, feed means operatively associated with said carrier including power driven feed control means, signal means responsive to actual feed rates below a predetermined reference rate and control means responsive to said signal means and connected to said power driven feed means for automatically terminating feed in the forming direction in response to actual feed rates below the reference rate and then restoring feed in the forming direction.

2. An apparatus for controlling the operation of a machine for drilling a workpiece by means of a tool oscillated at high frequencies and minute amplitudes while fed non-positively along a line of drilling in association with a workpiece at an area flooded with an abrasive in liquid suspension, comprising power driven feed control means operable at a reference rate to determine machine feed, signal means responsive to actual feed rates less than said reference rate, and control means operatively connected between said signal means and said power means to reverse said power means and retract the drilling tool for a predetermined period and then restore the predetermined feed rate.

3. Apparatus for obtaining optimum feed rate of a forming tool oscillated at high frequency and minute amplitude while in association with a workpiece, comprising a high frequency tool driving assembly, a carrier for said assembly movable relative to the work along the desired line of operation for non-positive feeding in the forming direction, feed means providing a reference feed rate for said carrier including controllable power means and a control element driven thereby in one direction at a predetermined rate to determine the maximum feed rate of said carrier in the forming direction, signal means responsive to actual feed rates below said predetermined rate, and control means responsive to said signal means and connected to said power means for automatically reversing said power means and the direction of movement of said feed control element for retracting said carrier in response to actual feed rates below said reference rate and then restoring feed at the reference rate and in the forming direction.

4. Apparatus for forming materials by means of a tool fed relative to the work while oscillating at high frequencies and minute amplitude in association with a workpiece flooded with an abrasive in liquid suspension comprising a forming unit including a tool and a high frequency driver therefor, a carrier supporting said unit for movement to direct said tool along the forming path, feed means operatively associated with said carrier including reversible power driven feed control means for determining a reference feed rate, signal means responsive to actual feed rates below the reference rate, and control means responsive to said signal means and connected to said power driven means operative to reverse said power driven means for a predetermined period and then restore feed at the predetermined rate.

5. Apparatus as set forth in claim 4 wherein said control means includes an electrical circuit and adjustable timer means in said circuit for controlling the duration of reversal of said power driven feed control means.

6. Apparatus for drilling a workpiece by means of a tool oscillated at high frequencies and minute amplitudes along a line of drilling while in association with a workpiece at an area flooded with an abrasive in liquid suspension, comprising a base, a drilling assembly including a tool and a high frequency driver therefor, a support for said assembly, a workpiece support, means on said base carrying said supports for relative movement along the line of drilling, feed means operatively associated with one of said supports for causing non-positive approach thereof toward the other support for feed movement during drilling including reversible power driven feed control means for allowing relative approach of the supports at a predetermined desired feed rate, signal means responsive to actual drilling rates and relative approach of the supports at less than said desired rate operative to automatically reverse the power means and relatively retract the supports and then restore feeding in the opposite direction.

7. Apparatus for forming materials by means of a tool fed relative to the work while oscillating at high frequencies and minute amplitudes, comprising a forming unit including a tool and a high frequency driver therefor, carrier means supporting and directing said unit in its operation with a non-positive feed relative to the work in one direction for forming, power driven feed control means in operative association with said carrier means, signal means responsive to actual feed rates less than a predetermined reference feed rate, and control means responsive to said signal means and connected to said power driven means for automatically retracting said carrier means in response to feed rates below said reference rate and then restoring feed in the forming direction.

8. Apparatus for forming materials by means of a tool fed relative to the work while oscillating at high frequencies and minute amplitudes, comprising a forming unit including a tool and a high frequency driver therefor, carrier means supporting and directing said unit in its operation for downward feed in a non-positive manner for forming, adjustable power driven feed control means in operative association with said carrier means for determining a desired reference rate of downward feed, signal means responsive to deviation of downward feed below the reference rate, and control means responsive to said signal means connected to said power driven means for automatically momentarily reversing the power means to retract and raise the tool and then restore downward feed at the reference rate.

9. Apparatus for drilling a workpiece by means of a tool oscillated at high frequencies and minute amplitudes along the line of drilling while in association with a workpiece at an area flooded with an abrasive in liquid suspension, comprising a drilling assembly including a tool and a high frequency driver therefor, said tool having an optimum amplitude of oscillation at operating frequencies of the assembly when its movement is free and undamped, a carrier for said assembly movable along the line of drilling to direct the tool in its operation, feed means operatively associated with said carrier including adjustable power driven feed control means, signal means responsive to reduction of actual feed rate below a predetermined reference rate resulting from jamming of the tool or damping of its amplitude of oscillation, and control means for said power driven means responsive to said signal means for automatically adjusting the rate of said power means to determine the feed rate of said tool to maintain optimum feed and optimum amplitude of tool oscillation under operating conditions.

10. Apparatus for drilling a workpiece by means of a tool oscillated at high frequencies and minute amplitudes along a substantially vertical line of drilling while in association with a workpiece at an area flooded with an abrasive in liquid suspension, comprising a drilling assembly including a tool and a high frequency driver therefor, a carrier for said assembly movable vertically to direct the tool in its operation, a supporting beam in said apparatus carried for pivoting movement about a point between its ends, means connecting said carrier to said beam at one end thereof, counterbalance means connected to said beam at the other end thereof, the balance relationship being such that the carrier is urged downward in a non-positive manner by gravity, a retractable feed control rod in operative association with the upper surface of said beam adjacent said other end, power means for vertical movement of said control rod to control the downward feed rate of said carrier and drilling assembly, switch means on said beam cooperating with said control rod and responsive to displacement therebetween resulting from actual drilling rates less than that determined by the upward movement of said rod, and control means operatively connected between said switch means and said power means for control thereof in response to said relative displacement.

11. An apparatus as set forth in claim 10 wherein said control means includes means for momentarily reversing said power means to retract said drilling assembly upon deviation between actual and reference feed rates.

12. An apparatus as set forth in claim 11 wherein said control means includes an adjustable timer for determining the period of reversal of said power means.

References Cited in the file of this patent

UNITED STATES PATENTS

| 2,587,352 | Manning | Feb. 26, 1952 |
| 2,601,157 | Le Lan | June 17, 1952 |

FOREIGN PATENTS

| 22,195 | Russia | Aug. 27, 1912 |
| 770,314 | Great Britain | Mar. 20, 1957 |